United States Patent

[11] 3,593,158

[72] Inventors Richard C. Day
  New Brighton;
  Frederick M. Green, Bloomington; William A. Mitchell, Bloomington, all of, Minn.
[21] Appl. No. 830,446
[22] Filed June 4, 1969
[45] Patented July 13, 1971
[73] Assignee Control Data Corporation
  Minneapolis, Minn.

[54] VARIABLE FREQUENCY PULSE GENERATOR
  10 Claims, 2 Drawing Figs.
[52] U.S. Cl. ................................................. 328/55,
  307/208, 307/265, 307/293, 328/63, 328/72
[51] Int. Cl. ........................................... H03k 5/159
[50] Field of Search.................................... 307/208,
  260, 265, 269, 293; 328/55, 56, 60, 61, 62, 63, 72

[56] References Cited
UNITED STATES PATENTS

| | | | |
|---|---|---|---|
| 3,226,648 | 12/1965 | Davidson | 328/63 |
| 3,314,013 | 4/1967 | Dirac et al. | 307/269 X |
| 3,392,350 | 7/1968 | Griffin | 307/208 X |
| 3,440,546 | 4/1969 | Nelson | 328/60 X |
| 3,510,786 | 5/1970 | Paulson | 328/63 X |

Primary Examiner—Stanley D. Miller, Jr.
Attorney—Cushman, Darby & Cushman

ABSTRACT: A variable timing system for use with digital devices or computers wherein the system includes a plurality of stages and whereby the system enables the selection of a predetermined rate and length of the timing pulses whereby the timing of at least a portion of the associated computer is controlled by the system of this invention.

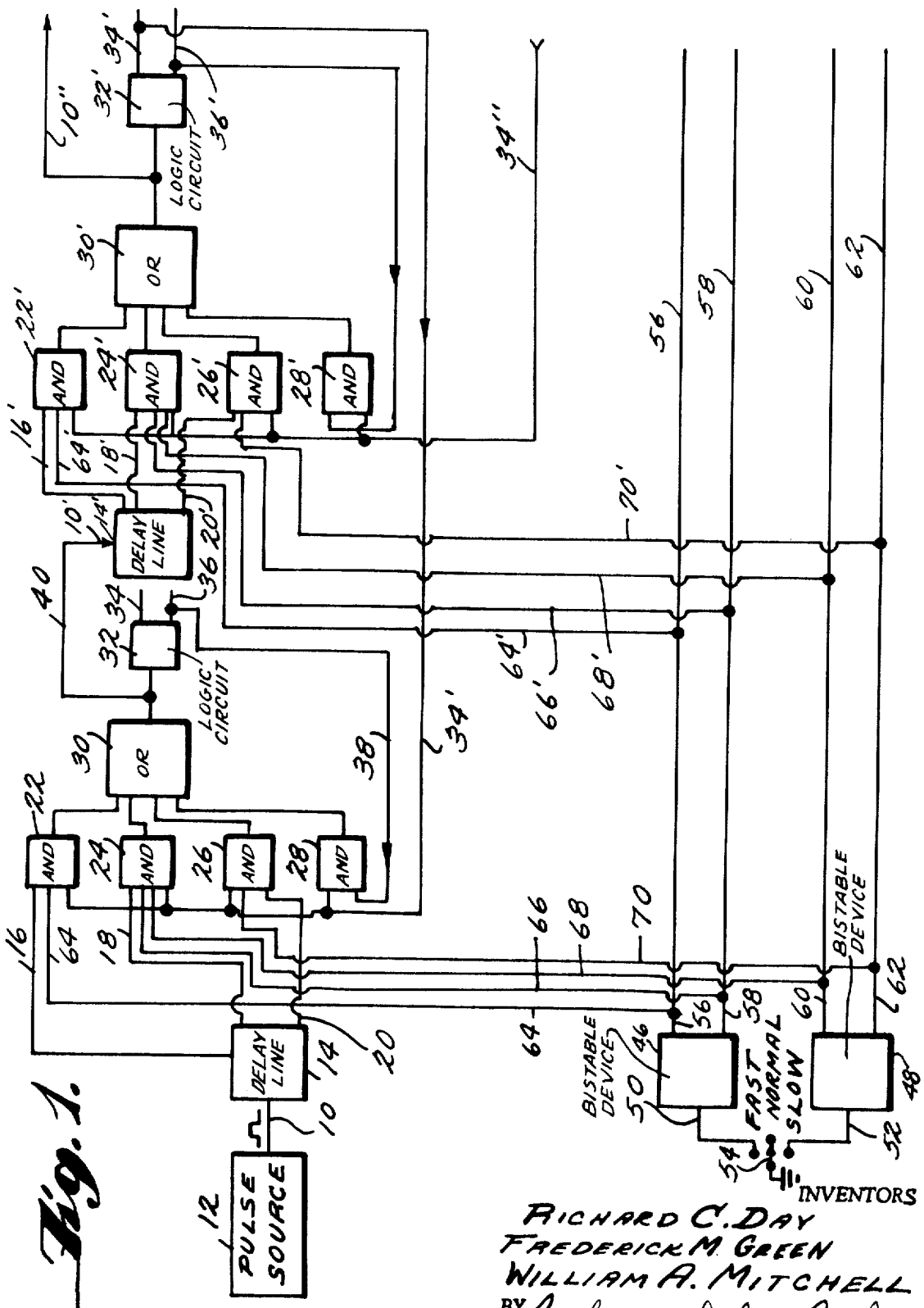

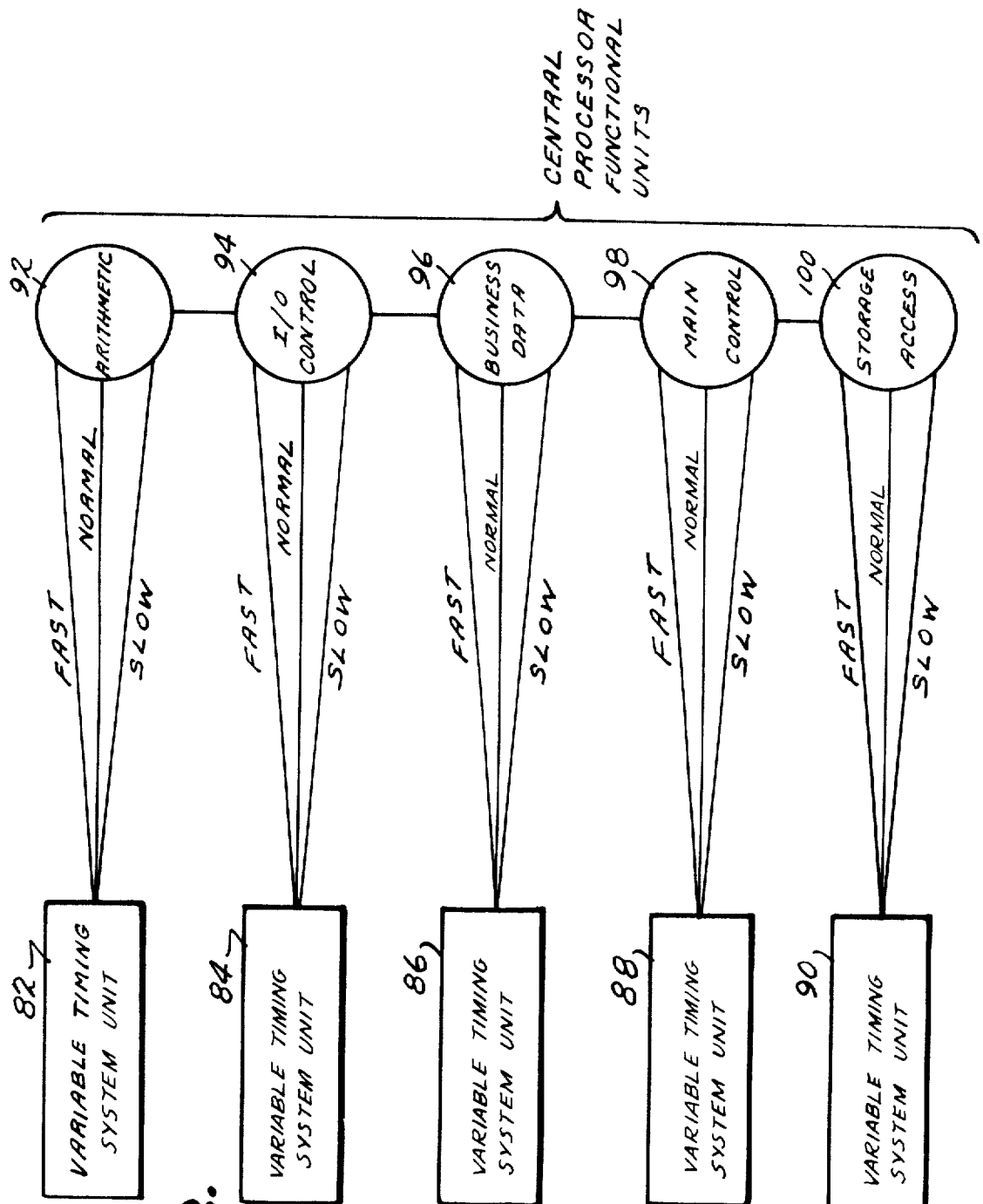

VARIABLE FREQUENCY PULSE GENERATOR

The present invention relates to a unique variable timing system and more particularly to such a system for use with digital devices wherein the frequency and duration of the pulses produced by the system are controllable so as to determine the timing or speed of operation of the digital device or computer associated therewith.

In the past, the variation of timing rates has been achieved by power supply adjustment, oscillator adjustment, replacement of logic cards, or by the varying of wire lengths. Other methods of varying the rates of computer timing pulses have also been utilized; however, the use of such prior methods has required a familiarity with the logic to some degree by the person seeking to change the timing of the computer, but more particularly, a thorough knowledge of the location of the various adjustment points has been required. In addition, such prior methods have been comparatively time consuming to perform so that satisfactory results have been difficult to achieve.

Accordingly, the general purpose of this invention is to provide a variable timing system for use with digital devices or computers wherein a switching arrangement is incorporated to easily and simply enable the variations in timing rate and pulse duration of the timing pulses.

An object of the present invention is to provide a system for enabling the selection of the characteristics of timing pulses which are to be utilized in conjunction with digital devices or computers.

Another object is to provide such a system wherein the frequency and pulse width of timing pulses for use with digital devices can be manually selected.

A further object of the invention is to provide such a system which is adapted to be associated with individual functional units of a digital device whereby each of the separate functional units can be individually controlled by the system of this invention.

Other objects and features of the invention will become apparent to those of ordinary skill in the art as the disclosure is made in the following description of a preferred embodiment of the invention as illustrated in the accompanying drawings in which:

FIG. 1 is a block diagram illustrating two stages of the present invention; and

FIG. 2 is a block diagram illustrating the system of this invention as associated with each of five representative functional units of a computer system.

With reference now to the drawings, there is shown in FIG. 1, which illustrates a preferred embodiment of two stages of the present invention, a line 10 for receiving incoming signal pulses from a preceding stage or pulse shaper (not shown) or from a pulse source 12. Coupled to the input line 10 is the delay line 14, which in this embodiment includes three taps or tap lines 16, 18 and 20 corresponding, for example, to delay of 14.5 nanoseconds, 16 nanoseconds and 17.5 nanoseconds, respectively. Of course, it should be understood that these delay times are merely representative and that any number of taplines and associated delay times could be utilized. The taplines 16—20 are respectively associated with AND gates 22, 24, and 26, the outputs of which are coupled to the input of OR gate 30. In addition, the output of AND gate 28 is also coupled to the input of OR gate 30. The output of OR gate 30 is coupled to logic circuit 32, which has an inverting output 34 and a noninverting output 36. The output line 36 is coupled to the digital device or computer (not shown) which is to be controlled while the output 34 is coupled to the preceding stage (not shown) in the same manner as the output 34' in the following stage is coupled to AND gates 22—28. In addition, output line 36 is coupled to the input of AND gate 28 via line 38.

The output of OR gate 30 is coupled via input line 10' to the delay 14' of the following stage. Each of the stages of the system of this invention are identical with respect to each other, as illustrated in FIG. 1, wherein the primed numerals of the second stage illustrated correspond to the unprimed numerals in the first illustrated stage.

Also associated with each of the stages of the apparatus of this invention are means for determining the extent of the delay imparted to the signal by the delays 14, 14', etc. to the signals as they are passed through the AND gates to the respective circuits 32, 32', etc. These include first and second switch-shaper circuits 46 and 48, respectively, which may be bistable flip-flops, and input lines 50 and 52 wherein each of the inputs 50 and 52 are associated with switch 54, which is preferably a three-position switch. Each of the switch-shaper circuits or flip-flops 46 and 48 include two outputs wherein the first circuit 46 includes outputs 56 and 58 wherein the second circuit includes outputs 60 and 62. Each of the outputs are in circuit connection with each of the plurality of stages of one unit of the apparatus, and output 56 is coupled to the inputs of AND gates 22, 22', etc. via lines 64, 64', etc. Similarly, line 58 is coupled to the inputs of AND gates 24, 24', etc. by means of lines 66, 66', etc.; output 60 is likewise coupled to the inputs of AND gates 24, 24', etc. by means of lines 68, 68', etc.; and output 62 is coupled to the inputs of AND gates 26, 26', etc. by means of lines 70, 70', etc.; The signals present on outputs 56 and 58 are always representative of mutually inverted binary values from one another; the same is true of signals present on output 60 and 62.

FIG. 2 shows an arrangement of five variable timing system units 82, 84, 86, 88 and 90 according to this invention wherein each of the individual units is associated with a separate functional unit 92, 94, 96, 98 and 100 of a computer or other digital device. Unit 92 may include logic for performing various mathematical operations, unit 94 represents the input/output control which enables the computer to communicate with slower or faster operating equipment, and unit 96 is the business data processing section. The system 88 is associated with the main control unit 98 of the digital or computer device which acts as the central nervous system of the device to generate stop/start signals and to tell the other units when to operate, while the system 90 is associated with the storage access unit 100 of the device which includes logic to store and retrieve information. As will be hereinafter explained, each of the variable timing system units 82—90 can be individually controlled so as to separately determine the speed of operation of the respective units 92—100 of the computer device. By means of the system of this invention, the functional units may be operated individually or together in any combination of speeds desired so that during normal maintenance checks the units may be set to operate at "slow" speed or "fast" speed to detect component degradation or timing changes. The modular system illustrated in FIG. 2 has the added advantage of permitting emergency operation even though sizable differences in logic speed exist between the various functional units. For example, if a problem which is responsive to system operating speed is occurring during peak load time when it would be extremely costly to disrupt the system for maintenance, one or more of the junctional units may be placed in the "fast" or "slow" mode, or some combination thereof, so as to enable the job to run error free. As a result, correction of the problem may be left to a more convenient time. A primary advantage of the variable timing system of this invention is with respect to troubleshooting. Thus, if a condition exists in the "normal" timing mode such that a component is at or near the point of failure from a timing standpoint, it would probably mode undetected, and if it did occur it would be infrequent and difficult to locate. By the use of the variable timing system of this invention, these hidden or infrequent failures can be forced to occur and can by corrected before the onset of more serious problems merely y varying the speed of operation of the computer during a scheduled preventive maintenance period.

In the operation of the system of this invention, as illustrated in FIG. 1, and assuming "normal" operation of the system wherein the switch 54 is placed in its intermediate position, as illustrated, the input pulse from pulse source 12 or from a preceding stage or pulse shaper (not shown) passes through delay 14 so that variously delayed pulses are produced on the output taps 16, 18, and 20. When the switch 54 is located in its central position for "normal" operation of the system, the output voltages on lines 58 and 60 are at a level which represents the binary digit "one." In addition, the output voltages on lines 56 and 62 are at another level which represents the binary digit "zero." In addition, the outputs on lines 34, 34', etc. are normally "one" during those periods of time when no input signal is present at the input of circuits 32, 32', etc. Conversely, the outputs on lines 36, 36', etc. are normally "zero."

Thus, the presence of a signal in the tapped line 18 results in a "one" output from AND gate 24 since each of the inputs to that gate are "one" and since an AND gate is characterized by the production of a "one" output when all of the inputs to the gate are also "one." This "one" output signal from AND gate 24 results in a "one" output from OR gate 30 since an OR Gate produces a "one" output when one or more of the inputs to the gate is "one," and a "zero" output when all of the inputs to the gate are "zero." This "one" output from OR gate 30 passes to circuit 32 so that the normal "one" signal on output 34 is changed to a "zero" signal and so that the normal "zero" signal on output line 36 is changed to a "one" signal. The "one" signal on line 36 then passes into the digital device or computer to perform the desired timing operation therein, while the "zero" signal on output 34 passes back to the next preceding stage (not shown) to operate in a manner as will hereinafter be explained.

The output timing pulse or "one" signal on output line 36 also provides a "one" latching signal on line 38 which results in the generation of a "one" output signal from AND gate 28 since the other input line 34' thereto is also in a "one" state at this time. Thus, although the input pulse at input 10 may cease, as may the signal on tapline 18, the "one" output from AND gate 28 will "latch" on the output timing pulse on line 36 so that a "one" signal remains thereon.

The "one"'0 output from OR gate 30 is fed to the next succeeding stage via input line 10'. Because the switch 54 is set in the "normal" position, the AND gate 24' produces a "one" output upon the occurrence of a signal pulse on the tapline 18'. Just as in the preceding stage, this "one" output passes through OR gate 30' and on to circuit 32' so that the signal on line 36' changes from "zero" to "one" and the signal on line 34' changes from "one" to "zero." At this point, the output timing pulse on line 36' is fed to the computer to perform the required timing operation therein. Simultaneously, the change of the signal on line 34' from "one" to "zero" results in the change of the output from AND gate 28 from "one" to "-zero." The output from OR gate 30, as a result, also changes to "zero" so that the output timing pulse on line 36 changes from "one" to "zero." However, the "one" signal on output 36' has the effect of "latching" on AND gate 28' in the same manner as occurred with respect to AND gate 28 in the preceding stage, and as a result, the output timing pulse on line 36' is "latched" on. The operation of the system then continues in this manner for each of the next succeeding stages (not shown).

Thus, the system of this invention has the advantage of being able to shape the output timing pulse width according to the length of time required to feed back the "clear" pulse via lines 34, 34', etc. from the next succeeding stage. Accordingly, the timing pulse width decreases when a "fast" time is selected and increases when a "slow" time is selected by the switch 54. Furthermore, the system is capable of accurate operation for a wide range of incoming signal pulse lengths and operates effectively for incoming signal pulse lengths of from approximately twice the duration of the output timing pulses to a length just greater than the minimum required to effectively operate the latching circuit formed by circuits 28, 30 and 32, etc. Although the incoming signal pulses to each of the stages may vary in width over this extremely wide range for various reasons, the system of this invention acts to reshape them to the desired width by means of the production of the output timing pulses from 32, 32', etc.

In the event that it is desired to operate the system of this invention and the associated computer in the "fast" mode, for example, the switch 54 is moved from the position illustrated in FIG. 1 to a position in contact with the input line 50. This will have the of changing the output on line 56 from "zero" to "one" and of changing the output on line 58 from "one" to "-zero." As a result, the presence of a signal on the tapped line 16 causes the AND gate 22 to produce a "one" output since each of the inputs thereto are "one." None of the other AND gates 24, 26 or 28 will produce a "one" output since at least one of the inputs to each of those gates remains at "zero." Thus, this "one" signal is passed through OR gate 30 and on to circuit 32 in the manner previously explained for the "normal" operation of the system with the exception that the output timing pulse is produced on line 36 at an earlier time with respect to the occurrence of the incoming pulse at input 10 as compared to the time of the occurrence of the output timing pulse on line 36 with respect to the incoming signal pulse when the system was operating in the "normal" mode. From this point, the operation of the system is similar to that earlier described with the exception that the AND gates 22, 22', etc. produce the "one" output signal as opposed to the AND gates 24, 24', etc. as was the case when the system operated in the "normal" mode. In addition, when the system is operating in the "fast" mode, the width of the output timing pulses is less than the width of the output timing pulses when the system was operating in the "normal" mode by the amount of the time delay increment between taplines 16 and 18 of delay 14.

The operation of the system when it is set to operate in the "slow" mode is similar. In this case, the switch 54 is moved into contact with the input line 52 and instead of the AND gates 22, 22', etc. providing the "one" output signals, the AND gates 26, 26', etc. produce the "one" output signals after a greater delay has occurred as provided by the tapped lines 20, 20', etc. In the "slow" mode of operation the width of the output timing pulses is greater than the widths thereof in either of the "normal" or "fast" modes of operation of the system.

With reference again to FIG. 2, the advantages of this invention are clearly apparent wherein a single switch, i.e., switch 54 in FIG. 1, is provided for each of the separate timing system units 82—90 so that the simple positioning of this switch for each unit enables the control of the timing and the speed of operation for the respective functional unit of the computer. Thus, merely by positioning each of the switches 54 in each of the variable timing systems 82—90 the functional units may be operated individually or together in any combination of speeds desired. If component degradation resulting in marginal operation is suspected in a particular unit of the computer, for example, the speed of operation of that particular functional unit can readily be changed merely by moving the switch 54 withing the associated timing system so that the hidden failure can be forced to occur earlier than would normally be the case and the failure can be corrected before the onset of more serious problems and when the maintenance can be most conveniently performed.

The invention thus provides for a variable timing apparatus having a plurality of associated stages wherein the apparatus is adapted for use with digital devices or computers and wherein each of the stages of the apparatus includes means for receiving incoming signal pulses (10, 10', etc.), means for producing output timing pulses (32, 32', etc.) delayed with respect to and in response to the incoming signal pulses, means associated with the delay means for determining the extent of the delay (54, 46, 48 AND gates 22—28, OR gate 30), wherein the delay determining means is operatively associated by means of lines 56, 58, 60 and 62 with all of the stages to enable the determination of the extent of the delay for all stages, means associated with the producing means and with the delay means of a preceding stage for determining the time duration of the output timing pulses from the producing means (34', AND gates 22—28).

It should be understood, of course, that the foregoing disclosure relates to only a preferred embodiment of the invention and that numerous modifications or alterations may be made therein without departing from the spirit and the scope of the invention as set forth in the appended claims.

What we claim is:

1. Variable timing apparatus, said apparatus having a plurality of associated stages for use with digital devices and wherein each of said stages includes:
   means for receiving incoming signal pulses;
   means operatively associated with said receiving means for delaying said incoming pulses;
   means joined to said delay means for determining the extent of said delay;
   means connected to said delay determining means for producing output timing pulses in response to the delayed incoming signal pulses; and
   means for coupling said output timing pulses with the delay determining means of the preceding stage to control the time duration of the output timing pulses from said preceding stage.

2. Variable timing apparatus as in claim 1 wherein said delay determining means is operatively associated with all of said stages to enable the determination of the extent of said delay for all stages.

3. Variable timing apparatus as in claim 1 wherein said delay means is tapped to provide a plurality of delay times to said incoming signals.

4. Variable timing apparatus as in claim 3 wherein said determining means include:
   a plurality of AND gates in circuit with said delay means to receive the delayed pulses from said delay means and to provide input signals to said producing means.

5. Variable timing apparatus as in claim 4 wherein said determining means further include:
   at least one OR gate in circuit with the outputs of said AND gates and associated with said producing means for providing signals to said producing means.

6. Variable timing apparatus as in claim 5 wherein said determining means further include:
   a first flip-flop, the outputs of which are in circuit with a first grouping of said AND gates;
   a second flip-flop, the outputs of which are in circuit with a second grouping of said AND gates; and
   switch means associated with said first and second flip-flops for selectively determining the output characteristics of said flip-flops.

7. Variable timing apparatus as in claim 6 wherein said flip-flops are in circuit with each of said plurality of stages of said apparatus.

8. Variable timing apparatus as in claim 7 wherein certain of said AND gates are respectively coupled to each of said delay taps and wherein at least one additional one of said AND gates is coupled to an output of said output timing pulse producing means to selectively latch on said output timing pulse.

9. Variable timing apparatus as in claim 6 wherein said switch means is a three position switch including:
   a movable grounded contact;
   a first input in circuit with said first flip-flop to be engaged by said movable contact when said apparatus is to be operated in a fast mode;
   a second input in circuit with said second flip-flop to be engaged by said moveable contact when said apparatus is to be operated in a slow mode;
   said movable contact being positioned in a third position when said apparatus is to be operated in a normal mode.

10. Operatively variable timing device having a plurality of associated stages for use in combination with a digital device device a plurality of functional units, wherein one of said variable timing devices is respectively associated with each of said functional units to control the speed of operation thereof and wherein each stage of said timing devices include:
    means for receiving incoming signal pulses;
    delay means operatively associated with said receiving means for providing variable delays to said incoming signal pulses;
    a plurality of AND gates, each one operatively associated to receive said signal pulses from a predetermined delay;
    switching means associated with said plurality of AND gates to determine the gating thereof and to determine at what speed said device and said associated functional unit will operate;
    output means associated with said plurality of AND gates for providing output timing pulses of selected duration and frequency as at least partially determined by said switching means;
    a latching circuit associated with said AND gates of said stage and said output means of said stage for latching on each of said output timing pulses from said stage;
    means for enabling the termination of said output timing pulses from said stage upon the initiation of respective output timing pulses from said output means of the following stage.